United States Patent [19]

Warman

[11] 3,971,545
[45] July 27, 1976

[54] FLUID ACTUATED DYNAMIC BRAKE

[76] Inventor: Charles P. Warman, P.O. Box 1550, Wichita Falls, Tex. 76307

[22] Filed: Dec. 21, 1972

[21] Appl. No.: 317,407

Related U.S. Application Data

[60] Continuation-in-part of Ser. No. 245,754, April 20, 1972, abandoned, which is a continuation-in-part of Ser. No. 883,517, Dec. 9, 1969, abandoned, which is a division of Ser. No. 706,575, Feb. 19, 1968, Pat. No. 3,500,764.

[52] U.S. Cl. .......................................... 254/173 R
[51] Int. Cl. ............................................ B66d 1/48
[58] Field of Search ............ 254/173, 181, 185, 187

[56] References Cited
UNITED STATES PATENTS

| | | | |
|---|---|---|---|
| 2,966,221 | 12/1960 | Kinney | 254/187 |
| 3,497,787 | 2/1970 | Fuelster et al. | 254/173 |
| 3,653,636 | 4/1972 | Burrell | 254/173 R |

*Primary Examiner*—Stanley H. Tollberg

[57] ABSTRACT

A system for maintaining a lineal element, such as load transfer cables, at a constant tension to enable the transfer of a load, such as parcels, cargo, or the like, from one station to another, even though one or both stations are relatively moveable. Provision is made to maintain constant tension on winch lines, to enable the transfer of loads between two fixed stations, between a ship at sea and a stationary loading dock, or between two ships at sea, which are relatively moveable, by utilizing a continuously rotating, slipping clutch, which clutch is continuously cooled by circulating a fluid media therethrough to maintain the friction elements therein at a temperature below which the friction elements would become damaged.

One form of the dynamic brake mechanism is driven continuously, while operating, by a power means, such as a hydraulic motor which drives through a worm gear to rotate the body of the dynamic brake to present a new "live", moving surface for the friction element to engage, which normally can be run in either direction; however, in some instances it is to be rotated counter to the normal rotation of the element being braked.

11 Claims, 10 Drawing Figures

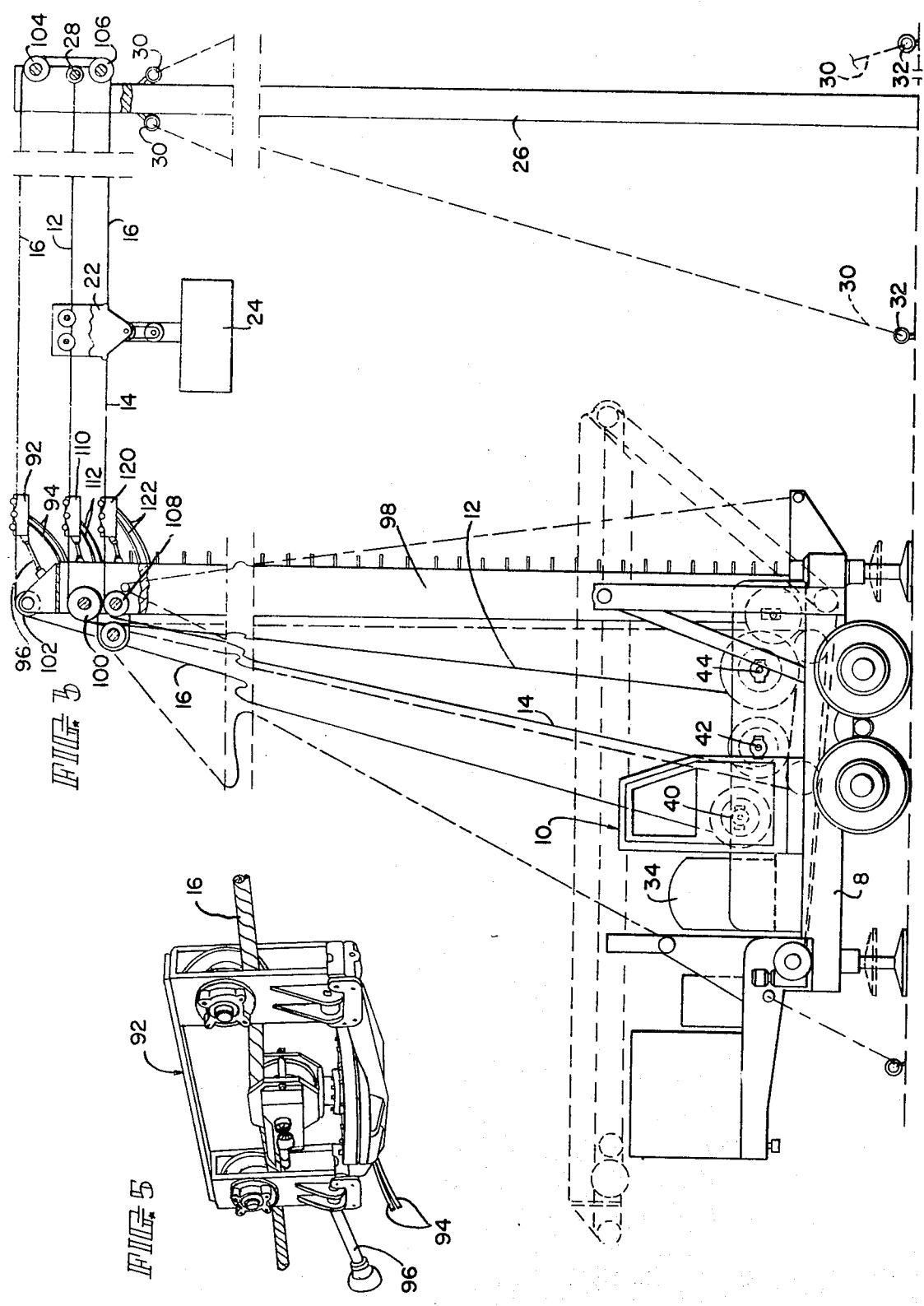

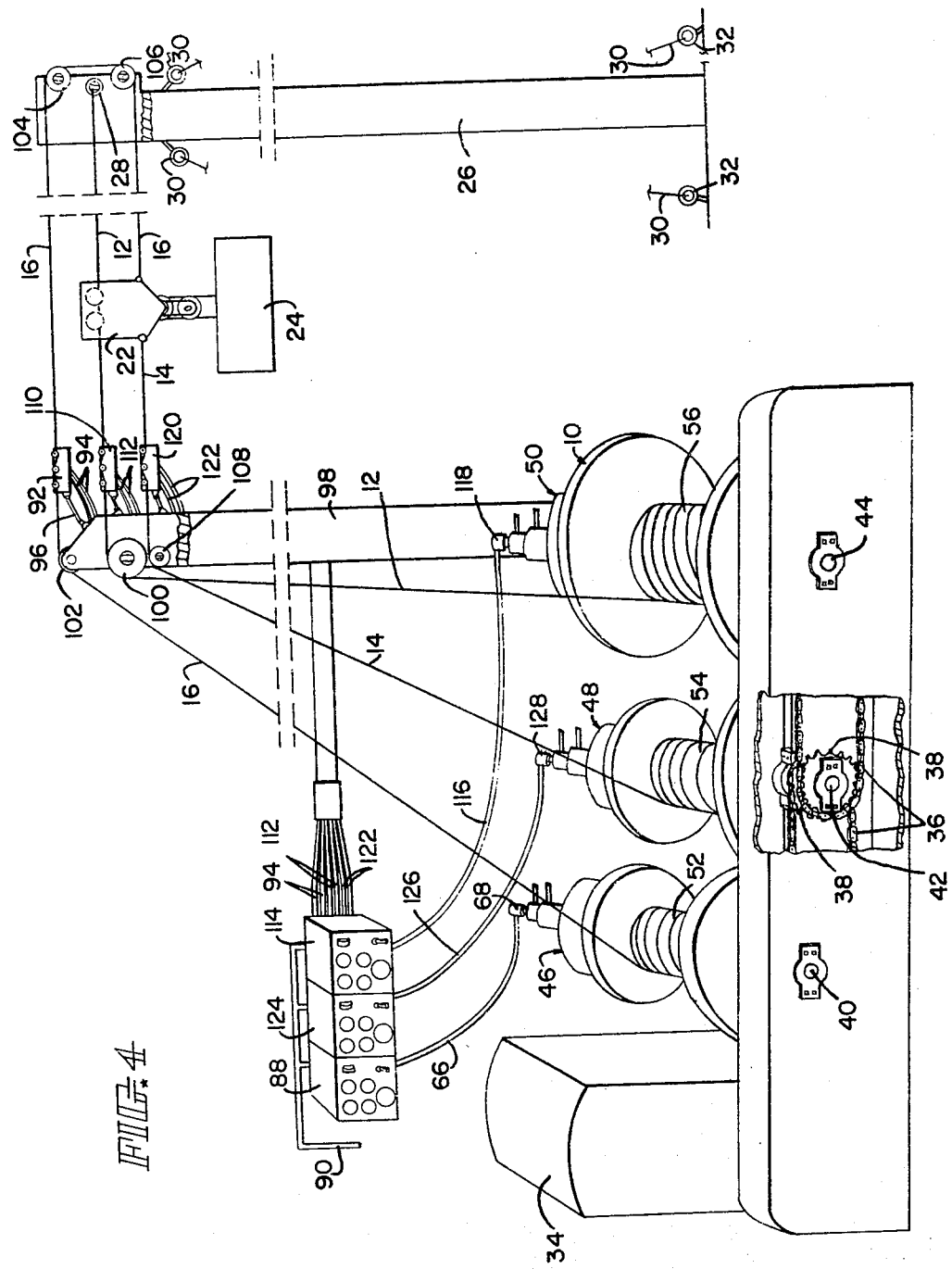

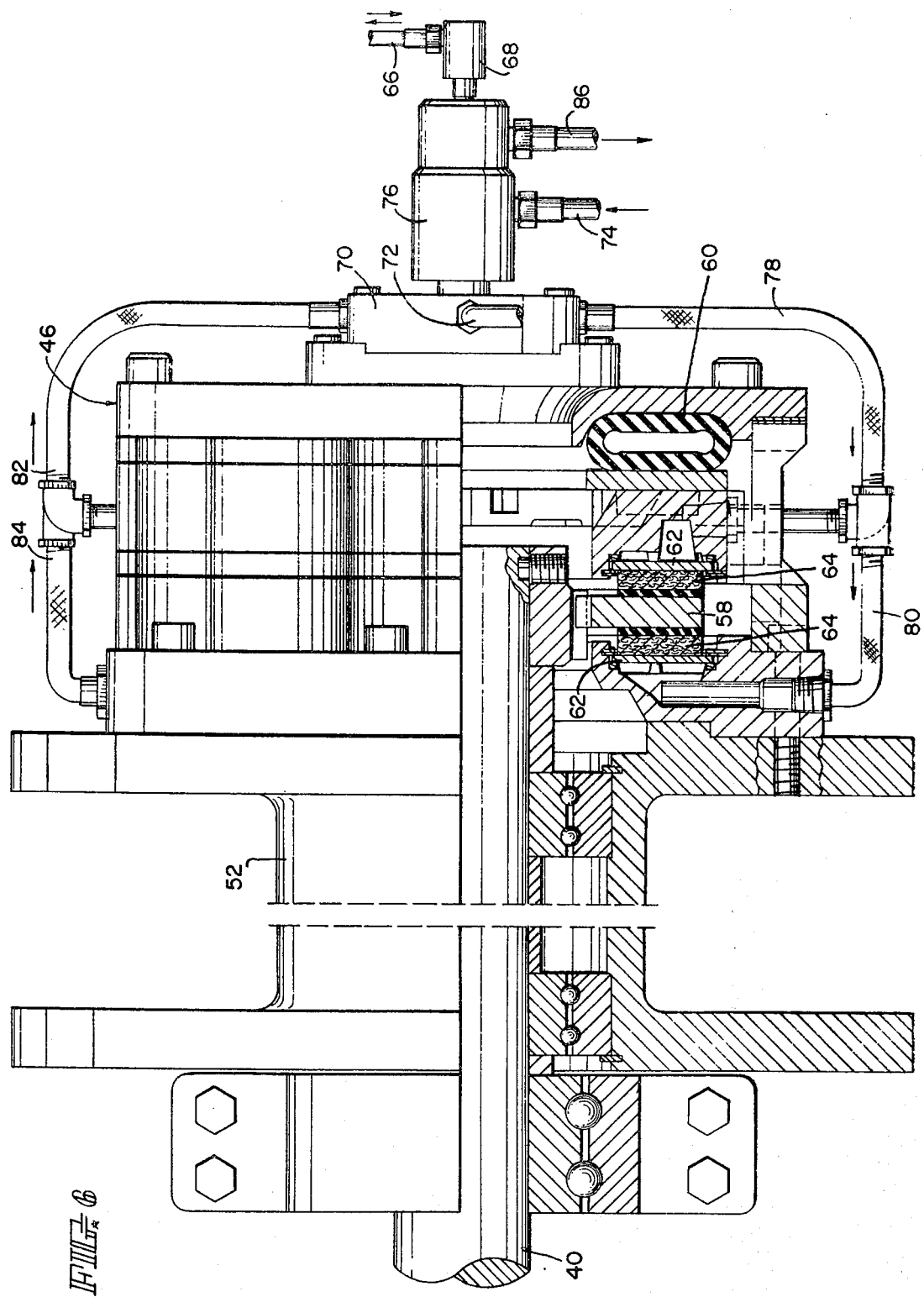

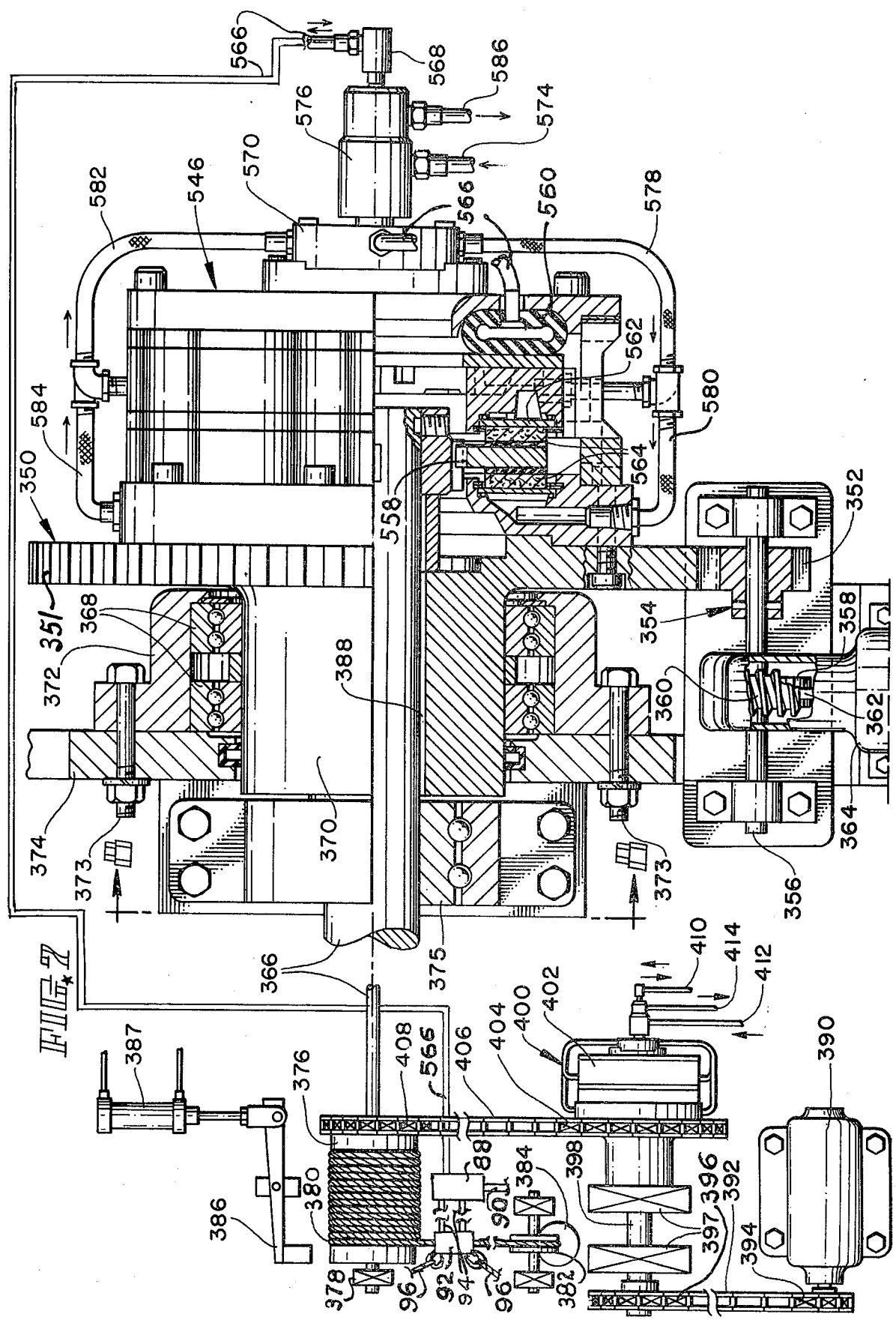

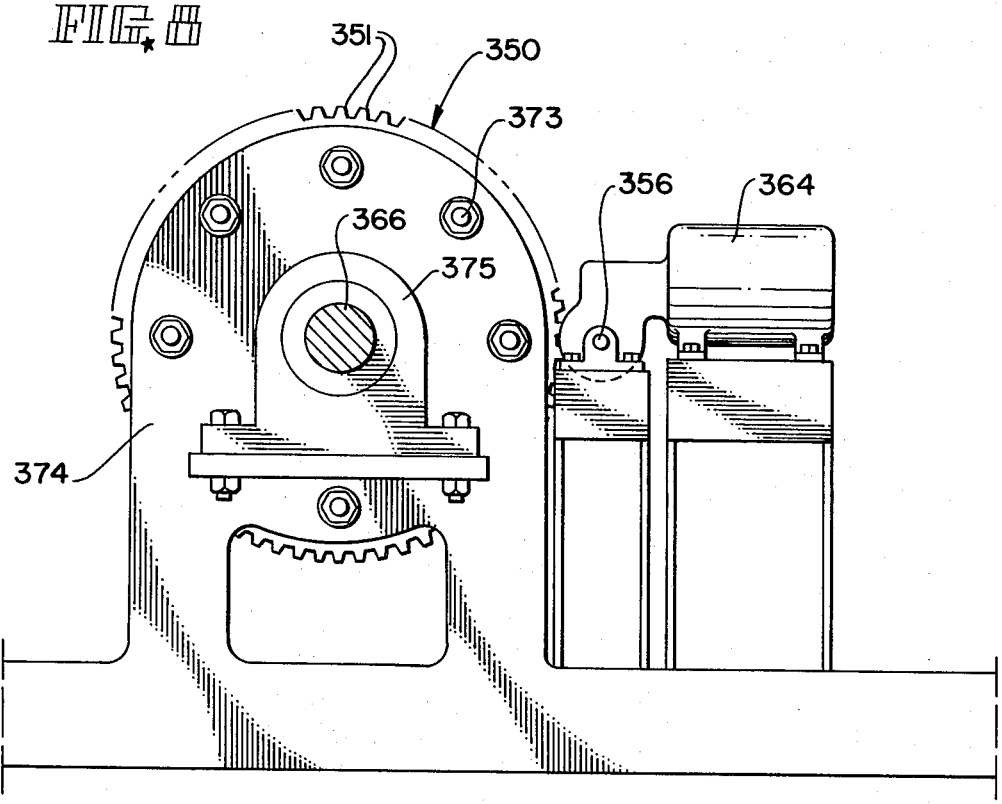

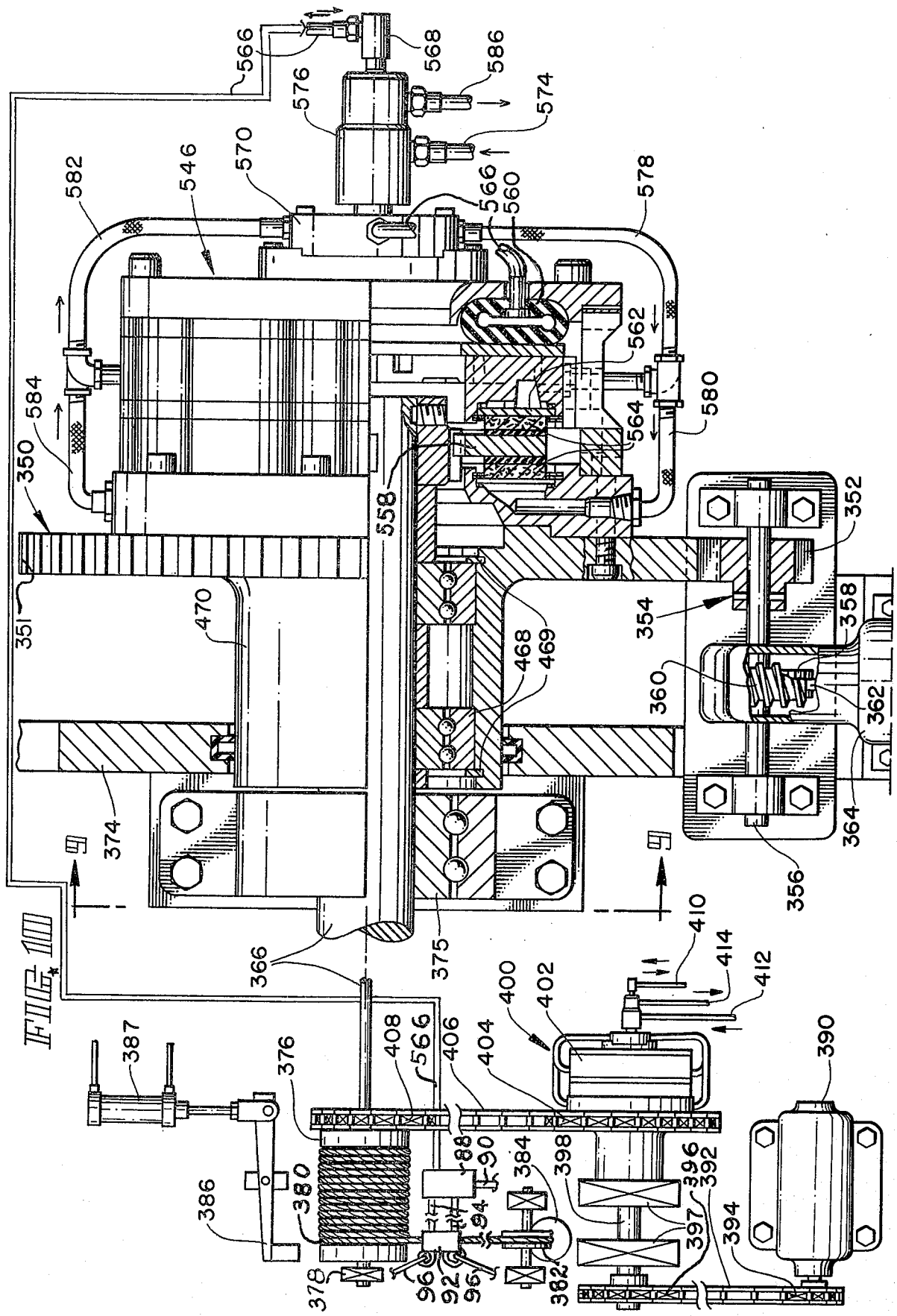

FLUID ACTUATED DYNAMIC BRAKE

BACKGROUND OF THE INVENTION

This application is a continuation-in-part of application Ser. No. 245,754, filed Apr. 20, 1972, for MECHANISM FOR MAINTAINING CONTROLLED TENSION ON CABLES, and co-pending therewith, now abandoned, which application is a continuation-in-part of application Ser. No. 883,517, filed Dec. 9, 1969, for MECHANISM FOR MAINTAINING CONTROLLED TENSION OF CABLES, now abandoned which application is a division of application Ser. No. 706,575, filed Feb. 19, 1968, for MECHANISM FOR TRANSFERRING LOADS THROUGH TENSIONED, CONTROLLED CABLES, now U.S. Pat. No. 3,500,764.

Reference is made to the following patent applications which are or were co-pending with the present application and have common subject matter:

Charles P. Warman, Ser. No. 556,793, filed May 6, 1966, for HEAT DISSIPATING CLUTCH OR BRAKE WITH A PERIPHERIALLY PIVOTED PLANAR WEAR PLATE FOR EXPANSIVE MOVEMENT IN A COEXTENSIVE PLANE, now U.S. Pat. No. 3,435,936, issued Apr. 1, 1969; and Charles P. Warman and Jack W. Moss, Ser. No. 687,538, filed Dec. 4, 1967, for MECHANISM FOR MAINTAINING CONSTANT TENSION abandoned and now continuation application Ser. No. 373,806, filed June 26, 1973.

This invention relates to improvements in ship to ship, or ship to shore cargo transfer and more particularly to a cargo transfer system which maintains constant tension on the support lines therebetween and a constant tension on a winch line which moves the cargo from ship to ship, or from ship to shore.

The art of extending lines between ships or lines between a ship and a stationary object on shore has long been practiced, but, due to the erratic movement of a ship or ships, the looseness or tautness of the lines caused by such movement, due to action of the waves thereagainst which causes a ship to roll, makes the use of such transfer lines undesirable unless these can be maintained at a constant tension at all times.

Various attempts have been made to perform this function, such as shown in the patent to Shillinger, Jr. U.S. Pat. No. 3,217,660 and Born et al. U.S. Pat. No. 3,361,080.

SUMMARY OF THE INVENTION

The present invention utilizes a system of maintaining all lines, utilized in the present system, at a constant tension under all conditions, to take up a given amount of slack within the line or lines, after the given amount of slack has been exhausted, as used in some devices heretofore, the cables become loose and the cables of the system have to be re-tightened and re-oriented.

With the present system, however, the support cable and both the "in-haul" and "out-haul" cables may be maintained at uniform, constant tension at all times for the full length of the extended cables, whether the ships are brought into side by side relation, or a ship is brought into adjacent relation with the stationary transfer station, even though the waves cause the ships during ship to ship operations, to roll in opposite directions, as this roll, pitch, or separation of the ships becomes less or greater, the cable will be reeled in, or payed out rapidly to fully compensate for such movement.

The present arrangement provides for a separate winch drum for each line used, with a clutch connected thereto, each which winch drum is driven through a clutch in such manner that the winch drum will always have a tendency to wind the cable thereonto, however, the clutch is normally slipped and the drive element is driven at a speed as fast as, or in excess of the maximum revolution at which the winch drum is ever expected to reel in cable.

An automatic sensor is associated with each winch line so that at any greater tension, other than the preset constant tension, the clutch will slip more, if the cable is being payed out, to enable the clutch to maintain the constant tension. The automatic sensor device will cause a greater degree of engagement of the interengaging clutch elements which will result in less slippage to drive the winch drum to reel cable in, if the tension on the cable is not as great as that at which the automatic sensor has been set to pre-tension the cable.

Each clutch becomes a dynamic brake, when the drums of the respective winches are rotated in the direction opposite the normal direction of rotation, by interengaging the clutch elements to a predetermined degree in accordance of the demand of a sensor associated with the cable.

While the invention has been primarily mentioned with respect to the transfer of a load, such as a cargo or parcels from ship to ship, or ship to shore, it is to be understood that the present cable tensioning arrangement to maintain a constant tension on a cable, is readily applicable to two spaced apart stations not associated with ships, such as maintaining a constant tension on a tram line to haul a load across inaccessible places, such as a canyon, a timbered area, or the like. While the present device primarily shows the use of three cables extending between spaced apart stations, with one cable being a tensioned support cable, two cables may be used between stations, thereby dispensing with the support cable, with the load being supported either by the in-haul and the out-haul cable, and supported therebetween.

The present slip clutch is fluid cooled and uitlizes the cooling system as shown in application for Ser. No. 556,793, filed May 6, 1966 for HEAT DISSIPATING CLUTCH OR BRAKE WITH A PERIPHERALLY PIVOTED PLANAR WEAR PLATE FOR EXPANSIVE MOVEMENT IN A COEXTENSIVE PLANE, now U.S. Pat. No. 3,435,936, which was co-pending with my original application, wherein the fluid circulated therethrough dissipates the heat generated by the friction elements of the clutch so that the clutch may slip continuously without damage thereto or to the friction elements associated therewith, as the heat is dissipated so the temperature will not be raised to a degree beyond that at which the clutch will operate efficiently.

The controls of the present device, for maintaining the cables at a constant tension may be of a character as shown in the patent to Art I. Robinson, U.S. Pat. No. 3,289,967, issued Dec. 6, 1966, TENSION REGULATOR, which cable sensing device is associated with a cable tension measuring device comprising three sheaves on the cable being tensioned, one of which sheaves is associated with a valving mechanism, which valving mechanism is connected with the sensor control unit which controls the pressure from a fluid supply line to a fluid actuated clutch so as to enable the fluid actuated clutch to be engaged or released in accordance with the pre-set cable sensing device.

The tensioning of the present cables utilizes a clutch system and cable tension control similar in character to the arrangement shown in the co-pending application of Charles P. Warman and Jack W. Moss, Ser. No. 687,538, filed Dec. 4, 1967, for MECHANISM FOR MAINTAINING CONSTANT TENSION.

OBJECTS OF THE INVENTION

An object of this invention is to provide a system for maintaining a constant tension on a winch line or lines to enable a load to be accurately and safely transferred between elevated stations by a cable.

Another object of the invention is to provide a winching system which will maintain a constant tension on one or more cables to enable the transfer of a load between a ship and a fixed station remote from the ship.

Still a further object of the invention is to provide, between two ships at sea, a load transfer system without either of the ships having to be anchored, and with provision being made for reeling in or paying out cable to compensate for the varying distance between the ships, or for motion caused by erratic movement thereof brought about by turbulent seas.

Another object of the invention is to provide a mechanism whereby a clutch is slipped to pay out or reel in cable for the entire length of the cable, without having to readjust the cable tensioning means for an undue amount of slack.

Yet another object of the invention is to provide automatic constant tensioning of the cables between stations, either on land or at sea, without the necessity of personnel having to tighten or loosen the winch lines.

A still further object of the invention is to provide a continuously slipping, fluid cooled clutch, which clutch is capable of being driven as fast as, or faster than the maximum speed at which a winch drum connected thereto is to be driven to reel cable thereonto and which clutch is capable of being slipped to enable the cable to be payed out to maintain the cable at a constant tension by a constant tension cable sensing device.

Still a further object of the invention is to provide a fluid actuated dynamic brake, a portion of which members will rotate in one direction, so as to present a moving braking surface at all times during the operation of the machine.

Yet another object of the invention is to provide a fluid actuated dynamic braking system which may be driven in either direction, depending upon the opeeration being performed.

yet another object of the invention is to provide a fluid actuated dynamic braking system which is driven in a direction counter to the normal rotation of the load being braked.

Yet a further object of the invention is to provide a sensored, controlled fluid actuated dynamic brake to provide a mating control arrangement for the resistive load, so the load may be controlled either in static condition or while moving in either direction.

Still another object of the invention is to provide a drilling rig drum which is driven by a prime mover through an air actuated clutch, so a controlled torque may be impressed on the fluid actuated clutch intermediate the prime mover and the drilling rig drum, so that the fluid actuated dynamic brake may maintain a constant weight on a drill bit suspended, by a cable, from the drum of the drilling rig.

A further object of the invention is to provide a fluid actuated dynamic brake which is driven by a worm gear and motor to rotate one of the friction mating elements.

BRIEF DESCRIPTION OF THE DRAWING

With these objects in mind and other which will become manifest as the description proceeds, reference is to be had to the accompanying drawings in which like reference characters designate like parts in the several views thereof, in which:

FIG. 3 is an enlarged side elevational vies of a winching mechanism mounted on a trailer, showing a load transfer system, including the mast of the winching mechanism in full outline in upright position, and showing an upright standard on a complementary station a spaced distance therefrom, the load carrying cable being shown as extending therebetween, and showing the in-haul and the out-haul cables positioned around the sheaves on both the upright standard and the upright mast, showing a trolley associated with the cables, with a load suspended therebelow, the lowered position of the mast being shown in dashed outline, with parts being broken away and shortened;

FIG. 4 is an enlarged view, partly in perspective, of winching and power drive mechanisms apart from the trailer, with parts broken away, and with parts shown in section, and showing the cables extending outward from the winches of the winching mechanism, over the mast and connected to the upright standard, showing a load supported on the cables intermediate the mast and the standard, and showing, diagrammatically, the cable tension sensing devices and the cable sensing control units associated therewith and with the source of air supply, with conduits being shown as leading from the sensing control units to the cable sensing control devices on the respective cables being tensioned and showing air lines leading to the respective clutches for operating the respective winch drums;

FIG. 5 is an enlarged, perspective view of the cable sensing device installed on a cable;

FIG. 6 is an enlarged fragmentary view of one of the winches and of one of the continuously slipping clutches associated therewith, with parts shown in elevation and with parts broken away and shortened to bring out the details of construction.

FIG. 7 is a longitudinal sectional view through one form of the fluid actuated dynamic brake, with parts broken away and with parts shown in elevation, showing a winch and drive mechanism on a reduced scale, with tension control sensors thereon;

FIG. 8 is a sectional view taken on the line 8—8 of FIG. 7, looking in the direction indicated by the arrows;

FIG. 10 is a view similar to FIG. 7, but of a modified form of the invention.

DESCRIPTION OF THE INVENTION

Figure 1:
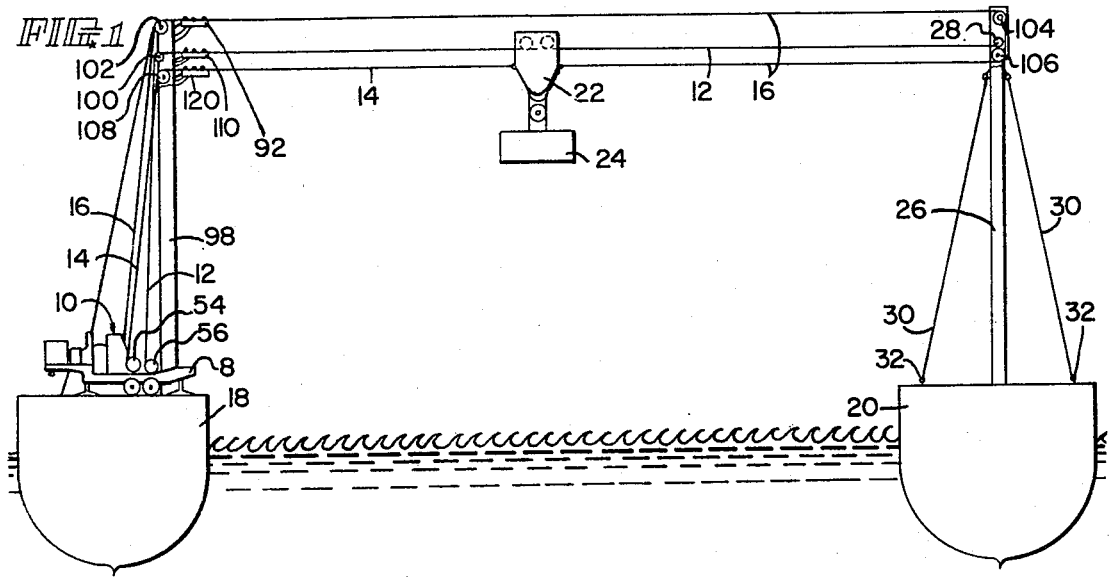
FIG. 1 is an elevational view showing two ships, with one form of transfer system extending therebetween, showing the winch mechanism mounted on one ship.
Figure 2:
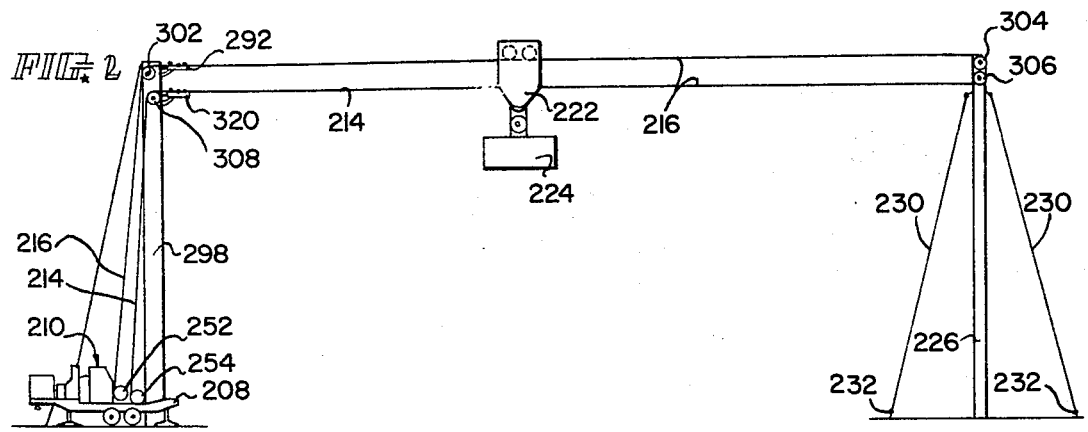
FIG. 2 is a modified form of the cable transfer system extending between two stations, which may either be located on ships or on stationary locations, showing two lines as utilized for the transfer of articles between the stations.

With more detailed reference to the drawing, the numeral 8 designates generally a base or trailer unit for mounting the winching mechanism, which is designated generally by the numeral 10. While the present unit is shown as mounted on a trailer for portability, it is to be understood that this is considered as a base, whether movable or stationary. The winching mechanism 10, and the cables associated therewith, have constant tension control mechanisms associated therewith to maintain support cable 12, in-haul cable 14 and outhaul cable 16 at a constant tension between ships 18 and 20, or between other spaced apart stations so a trolley 22 may transfer loads 24 from one ship to another, as will best be seen in FIGS. 1, 3 and 4, or as shown in a modified form of the invention, from one station to another, as shown in FIG. 2.

The form of winch mechanism, as illustrated in FIGS. 1 and 3 through 6, embodies a system which utilizes three cables between two elevated stations such as between the upper portions of an upright standard 26 and the upper portion of a mast 98 of ships or a ship to shore station, or two elevated stations on the land, with cable 12 being used solely to support the trolley 22 and the load 24 carried thereby, with the cable 12 being anchored to the upright standard 26 by an anchor member 28, which upright standard 26 is maintained in upright position by guy wires 30 which are attached to the standard 26 and to an anchor member 32.

The winch mechanism 10, which, in the present instance, includes a power drive unit 34 and multiple chains 36 connected thereto in driving relation, to drive several sprockets, which are indicated generally by the numeral 38, which chains 36 are connected with the power unit 34 so as to rotate shafts 40, 42 and 44 in a direction so that, when the respective clutches 46, 48 and 50 are engaged, the winch drums 52, 54 and 56 will be so rotated in the direction to wind cable thereonto. The winch 56 will wind the support cable 12 thereonto, which cable is wound onto the drum of the winch until clutch 50 slips, and since the clutch is set to slip continuously at a predetermined tension, the cable 12 will be maintained at this tension as long as required.

All of the winch mechanisms, 52, 54 and 56 and the clutch mechanisms 46, 48 and 50, are of the general character as shown in FIG. 6, with each varying in size or pull capacity in accordance with the load which the winch is to handle. The enlarged view of the clutch 46, together with winch 52, as shown in FIG. 6, is representative of clutch unit 48 and winch 54 and clutch unit 50 and winch 56. The winch and clutch unit 48–54 utilizes a power driven shaft 40 which is connected in driving relation with clutch plate 58, which shaft and clutch plate are driven continuously through drive chains 36 by power unit 34. The present clutch is shown to be an air actuated clutch, having an axially expansible, elastomer tube element 60 therein, which element, when expanded, moves clutch wear plates 62 into binding engagement with friction elements 64, on clutch plate 58, to a degree proportionate to the tension at which it is desired to degree proportionate to the tension at which it is desired to engage clutch 46 to rotate winch drum 52 or tend to rotate winch drum 52, or tend to hold winch drum 52 against retrogression, when the cable 16 is being payed out.

Air, under pressure, is admitted into clutch 46 through a conduit 66 into the stationary portion of rotary fluid seal 68 which seal passes air therethrough and into a passage within the axially rotatable member therein and into distributor ring 70, which ring 70 rotates with the clutch 46. The air is then passed out through conduit 72, which connects with the axially expansible, elastomer tube 60 in a manner well understood in the art of air clutches, and which is more fully brought out in the copending application of Charles P. Warman and Jack W. Moss, as set out above.

The present clutches are fluid cooled and are of the general character illustrated in FIG. 6 and further described in the copending application of Charles P. Warman and, Charles P. Warman and Jack W. Moss, above mentioned, and are designed to circulate water, or other fluid, through conduit 74 into the stationary portion of rotary fluid seal 76, which is channeled to pass fluid therethrough into an axial element which has passages therein, and into distributor ring 70, thence out through conduits 78 and 80 to direct water into and through the passages within clutch 46 and outward therefrom to maintain the wear plates 62 therein sufficiently cool, so that the clutch may be slipped continuously, while maintaining the wear plates 62 engaged with the friction elements 64 on clutch plate 58, with the fluid passing through the passages within the clutch 46, the water or cooling fluid will be discharged into conduit 82 and conduit 84 to be returned to the distributor ring 70, which rotates with the clutch, thence into passages which connect with rotary fluid seal 76, which will permit the fluid to pass outward into conduit 86 into a suitable circulating system for cooling the fluid for reuse.

The winch 52 is connected with the out-haul line 16, which out-haul line passes over a sheave 102 on mast 98 and over sheaves 106 and 104 on upright standard 26, so, as the trolley 22 and load 24 are moved outward from slip 18, the in-haul cable or line 14, attached to the opposite side of the trolley 22, is unwound from winch drum 54, with a constant tension being exerted on the line 14 in such manner that the cable tends to be wound thereonto, so a constant tension will be maintained on the in-haul line 14, as the trolley 16 is moved outward by an increased tension being maintained thereon, due to a predetermined air pressure being impressed on the clutch 46 in accordance with the setting of the tension sensing control unit 88, which unit supplies air from air supply line 90 to cable tension sensing control unit 88, and therethrough at the pressure determined by cable tension sensing device 92 on cable 16. The cable tension sensing device is connected, through control sensing lines 94, in a manner as disclosed in the above designated application for patent of Charles P. Warman and Jack W. Moss, and the operation of which is more fully disclosed in the above mentioned patent to Art I. Robinson. The cable sensing device 92 is maintained against outward or inward movement by a universally mounted anchor arm 96 which is connected to the upright mast 98 and to the cable tension sensing device 92, and is maintained against outward or inward movement by the universally mounted anchor arm 96, which will enable the cable 16 to be swayed from side to side, and to move up and down, but all the while, operating effectively and efficiently.

The support cable 12 passes over a sheave 100 on the mast 98 and extends to the anchor member 28 on the upright standard 26. The arrangement as shown in FIGS. 1, 3 and 4, shows the load support cable 12 intermediate the out-haul cable 16 and the in-haul cable 14. The out-haul cable 16 passes over the sheaves 102 and over sheaves 104 and 106 and is anchored to a side of trolley 22, with the in-haul cable 14 being anchored to the opposite side of the trolley 22 and passing over a sheave 108, which cable extends downwardly therefrom and is wound onto the drum of winch 54.

The support cable 12 has a cable tension sensing device 110 mounted thereon, to which device 110 lines 112 are connected. The air lines pass downward and lead to cable tension sensing control unit 114 which controls the pressure from air supply line 90 into air line 116 which leads to the stationary portion of rotary fluid seal 118 and clutch 50. A cable tension sensing device 120 is associated with the in-haul line 14 and has air lines 122 connected therewith, which air lines connect with cable tension sensing control unit 124. The cable tension sensing control unit 124 has an air supply line 90 connected thereto to supply air to cable tension sensing device 124 through lines 122 which cable tension sensing control device 120 regulates the air pressure to air line 126 which leads from the air sensing control unit 124 and to the stationary portion of the rotary fluid seal 128. This arrangement enables air to be directed therethrough and into clutch 48 to impress pressure upon the expansible element within the clutch to exert the correct pressure upon the wear plates to cause the clutch to exert a predetermined tension as pre-set on the cable tension control unit 124. Each of the cable sensing control units 88, 114 and 124 have a manually controlled regulating element thereon to preset the pressure to be applied to the respective clutches with which they are connected so the clutches will each exert a torque in accordance with the setting of the respective cable tension sensing devices and the respective cable tension sensing control units.

It if is desired to move the load, such as indicated at 24, from ship 18 to ship 20, with the support line 12 properly tensioned, the regulator element on cable sensing control unit 88 is set at a pressure to exert a greater torque, due to pressure on the friction elements, than the regular element on cable sensing control unit 88, which will cause the clutch 46 to engage to such extent that the out-haul cable 16 will be wound onto the drum of the winch 52 to which the clutch 46 is connected, and the in-haul line 14 will be payed out from the drum of winch 54 as the clutch 48 will be set to slip to deliver less tension than the clutch 46, however, tension may be accurately controlled, so when the trolley 22 and load 24 reach the destination, greater tension may be applied to both the in-haul and the out-haul cables, which will cause movement of the trolley 22 to cease, thereby enable the load 24 to be removed therefrom.

With the arrangement described above, ships may be moved parallel to each other, they may converge or diverge or the waves may cause the ships to rock or roll in opposite directions, or in the same direction, with a constant tension being maintained on each of the lines in accordance with the respective settings of the cable tension sensing control units 88, 124, and 114 while the cables 16, 14 and 12 are being sensed for tension by the respective cable tension sensing devices 92, 120 and 112.

When it is desired to move the trolley 22 from ship 20 to ship 18, the cable sensing control unit 124 is set to direct a greater pressure from air supply line 90 into air line 126 so as to cause the clutch 48 to engage to a predetermined degree to rotate winch drum 54 to wind the cable 14 thereonto with the cable sensing control unit 88 being so adjusted that the cable tension sensing device 92 will maintain out-haul cable 16 at a lesser tension so as to permit slippage of clutch elements within clutch 46 to permit the cable to be reeled off the drum of winch 52. In this manner all the cables are automatically maintained at the desired constent tension, including the support cable, and the ships are free to maneuver within the length of the cables, without dropping the load into the water and without breaking the cables extending between the ships, or damaging the cargo or load as it is being loaded onto the trolley to be conveyed to the other ship or while it is being unloaded from the trolley onto the receiving ship.

The present device is particularly adaptable for the transfer of material between ships at sea, or from ship to shore or vice versa, or between two elevated stations where cables must be maintained at constant tension for the safety of the cargo and for the safety of the ship and/or dock personnel.

MODIFIED FORM OF THE INVENTION

The form of the invention as shown in FIG. 2 utilizes an upright standard 226 which is held in upright position by guy lines 230 secured to anchors 232 and to the upright standard and an upright mast 298, which may either be in a stationary location or on a ship or ships, with a winching mechanism designated generally at 210, which is mounted on a trailer or base 208, which base may be either portable or stationary.

An out-haul line 216 extends from a winch 252 and over sheave 302 on upright mast 298 and over sheave 304 and 306 on upright standard 226. The upper reach of the out-haul line 216 serves as a support line for trolley 222. The out-haul line 216 passes around sheave 306 and connects to a side of the trolley 222 opposite the in-haul line 214, with the in-haul line passing over sheaves 308 and being wound onto the drum of winch 254.

The out-haul line 216 has a cable tension sensing device 292 thereon, which is of the character shown in FIG. 5, and the in-haul line has a similar cable tension sensing device 320 thereon, so as to enable the respective cables to be maintained at a predetermined, constant tension in accordance with the setting of a cable tension sensing control unit 88 and a cable tension sensing control unit 124, as disclosed in FIG. 4 of the drawings, and as more specifically brought out in the above mentioned patent to Art. I. Robinson.

The load 224 may be moved between the upright mast 298 and the upright standard 226 by creating greater tension on either the out-haul line or the in-haul line with respect to the other of the lines, in the manner set out in the above described form of the invention, taken with the applications, as set out above, and the patent to Art I. Robinson, U.S. Pat. No. 3,289,967.

DYNAMIC BRAKE FLUID ACTUATED UNIT the dynamic brake per se is of the same construction as the clutch 46 disclosed in FIG. 6, of the present application, and as set out in the parent application, except, for purposes of describing the operation, the dynamic brake and the parts thereof, have been designated with the prefix "5" to the numerals as shown in FIG. 6. The dynamic brake is designated generally at 546, and has a body to which gear 350 is attached, which brake has wear plates 562 which are engageable with friction elements 564, which friction elements are on brake plate 558, which brake plate rotates with shaft 366.

An axially expansible elastomer tube 560 moves the wear plates 562 axially to engage friction elements 564 upon application of pressure to conduit 566, or to disengage the wear plates 562 therefrom upon release of fluid under pressure from conduit 566 which leads through roto-seal 568 and is connected with elastomer air tube 560 in a manner well understood in the art of axially expansible clutch and brake tubes.

Cooling fluid is introduced through conduit 574 to and through rotary fluid seal 576, thence through distributor ring 570 and conduits 578 and 580 through the passages within the body of the dynamic brake 546 and out through conduits 582 and 584 through rotary fluid seal 576 to be discharged from conduit 586 so as to prevent the friction elements from becoming overheated, while being used. All the details of construction of the brake are clearly illustrated in FIG. 6 and have been previously described.

THIRD FORM OF THE INVENTION

SUMMARY

Various forms of dynamic brakes have been proposed heretofore but these, for the most part, were complex in structure and were limited as to the utility and were not readily adaptable to many forms of installation.

The present dynamic brake is such that a portion of the brake apparatus is rotated continuously, in either direction, which rotating brake element continuously presents a new braking surface, and prevents the braking elements from gripping and holding; which in the case of an automobile or the like, will start a skid in which the friction will grow less and less as the automobile tires skid on the pavement or the like.

However, with the present braking mechanism, the braking element is continuously rotated to present a new braking surface and a new surface for engagement with the terrain or the like at all times, when used in connection with a vehicle.

The braking elements can be rotated counter to the normal rotation of the mechanism, or it may be rotated in the same direction at a relatively slow speed which will bring the vehicle, drum or the like to a speed no faster than the rotation of the element being braked. If desired, a positive brake may be applied for the final braking action.

By using dynamic braking in conjunction with loads, shock is minimized or alleviated, due to slowing the movement of heavy machinery, practically to a standstill, and then applying a final braking action to stop and/or hold the element being braked, such as a car, hoist drum, conveyor or the like, in any given position.

If one of the braking elements is operated counter to the normal rotation of the element being braked, the braked element can be brought to zero speed, held static, and even reversed if desired.

The braking element may be rotated either by an independent prime mover drive element that will take the full amount of torque to be braked, or it may be driven from a power take-off arrangement from the driven element and braked thereby, so long as the braking element braked is being rotated so as to continuously present a new braking surface.

DESCRIPTION OF THE THIRD FORM OF THE INVENTION

The form of the invention as shown in FIGS. 7 and 8 utilizes a clutch for a dynamic brake element, substantially as shown in FIG. 6 of the parent application which is a part thereof. However, in the present arrangement, a gear designated generally at 350, which has teeth 351 thereon, is fixedly secured to the housing of brake 546. The teeth 352 on pinion gear 354 engage teeth 351 of gear 350. The pinion gear 354 is mounted on and secured to a shaft 356 that has a worm gear 358 thereon and secured thereto so as to rotate integrally with pinion gear 354. The gear 358 is a mating gear for the worm of worm gear 360, which worm is on a motor shaft 362 of motor 364. this motor may be electric or hydraulic, as hereinbefore mentioned, or it may be driven from the power unit that drives shaft 366.

Depending on the size of the machinery being driven, the gear 350 can be rotated at a relatively slow speed, for most installations preferably from 3 to 20 RPM. The form of the invention as shown in FIGS. 7 and 8 shows the gear 350 supported on bearings 368, which bearings interfit between the hub 370 of gear 350 and a bearing housing 372 which is secured to a bearing support member 374 by bolts 373, in a manner as will best be seen in FIGS. 7 and 8. It is preferable to have bearings 368 spaced apart to hold the body of the dynamic brake 546 in properly aligned relation with respect to shaft 366, journaled in bearings 375.

The shaft 366 may be utilized to drive almost any type of machinery that requires braking. However, for the sake of simplicity, a cable winding drum 376, on a reduced scale, is shown secured to shaft 366. The shaft 366 is shown to have a bearing 378, which supports the outer end thereof.

A cable 380 is shown spooled upon the cable winding drum or winch drum in a manner well understood in the art of hoisting equipment. The cable is shown to pass over a sheave 382 and to extend downward to a load 384. However, this is for the purpose of graphic illustration, and is not to be construed as a limitation on the use of the dynamic brake, but merely a representation of one manner in which the brake can be used. A positive action brake 386, operated by fluid actuated cylinder 387, is shown diagrammatically to engage and hold the drum in any fixed position.

The dynamic brake 546 is fluid actuated and may have the sensing controls as hereinbefore set forth, and as set forth in the parent application, so as to minutely control and maintain a load in a given position by running one portion of the brake at a different speeded condition with respect to the other portion of the brake to enable the desired dynamic braking between the drive and driven elements.

As previously set forth in the specification, the dynamic brake body 546 is liquid cooled so the friction elements may be slipped continuously without generating an undue amount of heat and with a minimal of wear. The dynamic braking operations are fluid actuated, as by pneumatic pressure.

The shaft 366 passes through an axial opening 388 in hub 370 and is maintained in aligned relation by bearings 368 and 375. In this manner the housing of the dynamic brake 546 is supported on bearings 368, and the inner portion of the clutch is rotated by shaft 366 in non-contact relation when the air-actuated dynamic brake is released. In this manner no bending moments are placed upon shaft 366 by housing of the dynamic brake 546 and gear 350.

This form of the invention is shown to have a prime mover 390 which drives through an endless transmission means such as belts or a chain 392, as by sprockets or belts 394 and 396, to drive a shaft 398 on which a clutch generally designated by the numeral 400 is mounted. The clutch 400 has wear plates therein similar to clutch 46 so when engaging the friction elements therein, the body 402 of the clutch will be caused to rotate. The clutch body 402 has a sprocket or gear 404 mounted thereon and secured thereto to drive through transmission means 406 to a gear or sprocket 408 which is mounted on drum 376 to rotate the drum and the shaft 366 to which the drum is secured.

The clutch 400 is of the fluid-actuated type such as shown in FIG. 6, and has conduit 410 leading thereto to direct fluid under pressure thereinto to selectively engage the friction members therein to a predetermined degree to exert the desired torque on drum 376.

This clutch may be either manually or automatically controlled in the manner set out in the aforementioned specification. The clutch is preferably of the fluid-cooled type and has water inlet conduit 412 leading thereinto and a water outlet conduit 414 leading therefrom, so as to circulate water or other liquid coolant through the clutch 400 in the manner as hereinbefore set forth for clutch 46.

A prime mover 390 drives throgh transmission means, such as a belt or chain 392, pulleys or sprockets 394 and 396, through shaft 398, clutch 400, sprocket 404, chain 406, to gear or sprocket 408 on drum 376, which rotates the drum. However, at the same time that drum 376 is rotated by prime mover 390, the motor 364, through the worm and spur gear arrangements 358-360, and 351 and 354, the body of the dynamic brake member 546 will be rotated and frictional engagement between the wear plates and friction elements therein will be had in accordance with the air pressure impressed thereon through conduit 566. With the body of the dynamic brake 546 being rotated constantly, either counter to the rotation of shaft 366, or in the same direction at a relatively slow speed, a new braking surface is constantly being rotated for engagement, and by dissipating the heat with the liquid flowing through coolant pipes 578, 580, 582 and 584, the friction members within the clutch are maintained at a satisfactory operating temperature, and the drum 376 can be controlled to the desired speed or stopped with positive brake 386, which brake may be fluid-actuated by cylinder plunger assembly 387.

The air pressure on conduit 566 may be minutely controlled by regulator valves in the manner well understood in the art of fluid controls, or it may be controlled by a sensor acting in combination with the cable 380 in the manner as set forth above in the Robinson patent.

The cable tension sensing device 92 is shown mounted on cable 380, FIG. 7, and is shown to be held in supported relation with respect thereto by anchors 96. Air conduits 94 lead thereto and therefrom and are connected with cable tension sensing control unit 88, which is connected to an air supply line 90 so as to direct air under pressure or bleed air therefrom to conduit 566 leading to rotary fluid seal coupling 568 which is connected to the axially expansible fluid acutated tube 560 to engage and disengage the friction members of dynamic brake 546 in response to the cable sensing control unit 88, as more fully set forth in the first form of the invention, and to which further reference is to be had.

FOURTH FORM OF THE INVENTION

SUMMARY

Figure 9:
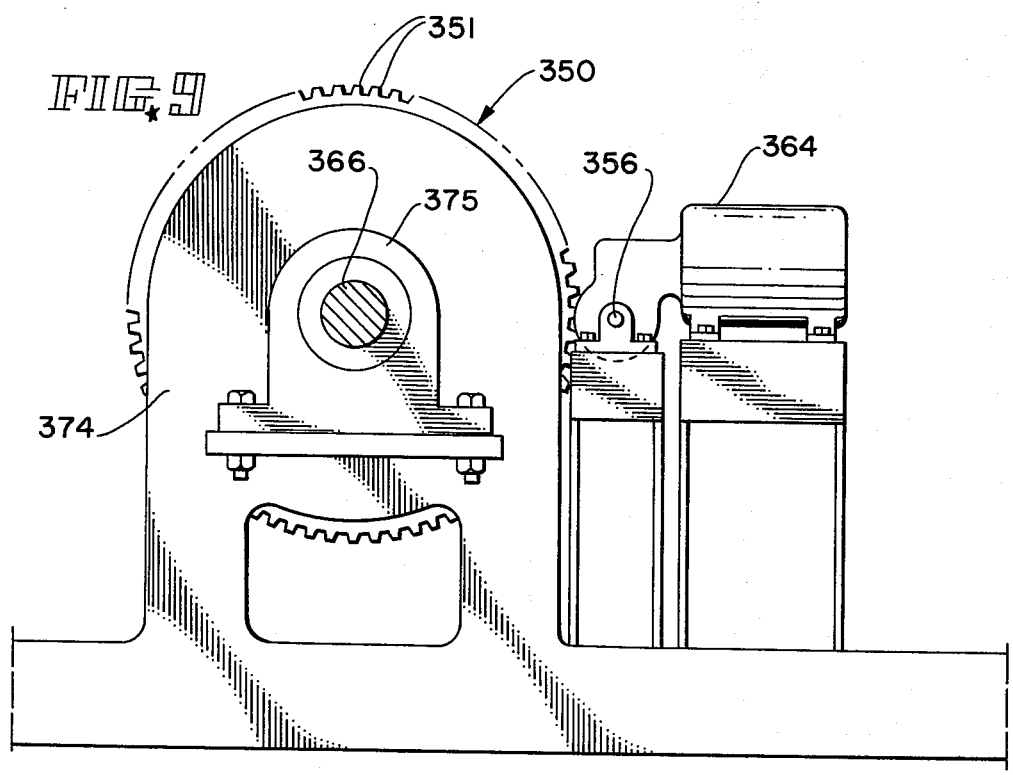
FIG. 9 is a view similar to FIG. 8, but taken on the line 9—9 of FIG. 10, looking in the direction indicated by the arrows.

The fourth form of the invention is shown in FIGS. 9 and 10 and differs primarily from the third form of the invention inasmuch as the shaft 366 is journaled in bearings 468 which support the gear 350 and dynamic brake 546 in close-coupled relation, so the minimum of bending moments is impressed upon the shaft by the load on gear 350 and by the weight of brake 546. The shaft 366 is journaled on bearings 375 in close proximity to one of the bearings 468.

The present form of the invention is operated in the same manner as the third form of the invention, but the bearing support arrangement 468 gives less bending moments, presents a minimum bending movement on shaft 366, and does not require a bearing exterior of the hub of the brake to support the load of the brake and the torque generating gear 350 and pinion 352 thereon. The motor 364, in the present form of the invention, is utilized to rotate the gear 350 in the manner as described for the third form of the invention.

DESCRIPTION OF FOURTH FORM OF THE INVENTION

The third and fourth forms of the invention have like reference numerals to designate like parts thereof, insofar as in consistent, to minimize the descriptive matter, but not abridging the right to describe these individually and completely, should this be desired or required.

The bearings 468 are within the hollow hub 470 of the torque generating gear 350. In this manner, the gear and the hub thereof can be accurately machined so when fitted on bearings 468, it will be in true aligned relation with shaft 366. This shaft 366 is shown to be in driving relation with a winch drum 376 and secured thereto to move a load 384, as set forth in the form of the invention described above. The bearings 468 are retained in place by snap rings 469 that are fitted in grooves within the bore of hub 470.

Both the third and fourth forms of the invention utilize the same form of drive mechanism, including a prime mover 390, a transmission connection, such endless transmission means 392, which may be belts or chains driving through pulleys or sprockets 394 and 396 to shaft 398, which shaft is mounted in journaled relation on bearings 397 to drive a friction element within clutch 400. The clutch 400 is a fluid actuated type clutch to engage friction members therein to rotate the body 402 to which a drive gear member or sprocket 404 is fixedly secured, so as to drive through a transmission means 406, such as a gear or chain to drive a sprocket or gear 408 which is connected in driving relation with a load lifting device, which, in the present instance, is a drum 376, which drum has a load lifitng cable 380 wound thereonto to pass over the sheave 382 to lift load 384.

The dynamic brake 546 utilizes a motor 364 to rotate worm gearing 358-360 to rotate spur gearing comprising pinion 354 and spur gear 350, which spur gear is attached of the dynamic brake, which brake 546 is a fluid actuated brake of the character of clutch 46 in the aforementioned form of the invention, and utilizes a conduit 566 to direct fluid under pressure thereinto to engage the friction members of the dynamic brake body with friction means such as a rotatable plate which is secured against rotation on shaft 366 so as to present the desired amount of torque on the shaft 366, which is being rotated either in the same direction, at a controlled speed, as the normal rotation of the drum 376 or in a direction counter to the normal rotation thereof.

The dynamic brake 546 is cooled in the same manner as set forth for clutch 46 as set forth for the clutch disclosed in the original application. With the motor 364 rotating the shaft 366 at the desired controlled speed, the desired torque on shaft 366 maintains a controlled braking action on drum 376 as set forth in the third form of the invention.

The cable tension sensing device 92 is shown mounted on cable 380, FIG. 10, and is shown to be held in supported relation with respect thereto by anchors 96. Air conduits 94 lead thereto and therefrom and are connected with cable tension sensing control unit 88, which is connected to an air supply line 90 so as to direct air under pressure or to bleed air therefrom to conduit 566 leading to rotary fluid seal coupling 568 which is connected to the axially expansible fluid actuated tube 560 to engage and disengage the friction members of dynamic brake 546 in response to the cable sensing control unit 88, as more fully set forth in the first form of the invention, and to which further reference is to be had.

The dynamic brake can carry all of the load 384, which may be a drill stem and drill bit, and bring the load on the cable to a stop, lift the load or let the load down. In the case of a drill stem and a drill bit, it will carry any amount of load up to the amount of load on the drill stem, within the capacity of the brake and maintain a uniform weight on the rotary drill bit, which is carried by cable 380. The tension of the cable 380 is controlled by the sensor 92 which actuates the controller unit 88, in the manner hereinbefore set out for sensing tension of cables.

As lengths of drill stem are added, such as load 384, the sensor controller unit 88 is adjusted so as to permit the same weight to be impressed on the drill bit, as it feeds downward, in the drilling of a well, with the dynamic brake permitting the cable 380 to be payed out from the drum 376. Each time lengths of drill pipe are added or the load is increased, the sensor controller unit 88 is readjusted, which permits the dynamic brake 546 to support the load, except the amount of weight which it is desired to be carried by the drill bit. In this mode of operation, the dynamic brake operates in an in-haul direction.

Having thus described my invention and the several modifications thereof, I claim;

1. A dynamic braking friction-coupled device to constantly rotate a friction element with respect to a driven friction element, including a first fluid pressure actuated device comprising:
   a. a first power drive unit,
      1. a first shaft,
      2. a load controlling device,
      3. a load moving device mounted on said first shaft,
   b. a second shaft,
      1. friction clutch means mounted on said second sahft and connected in power driven relation with said first power drive unit, and with said load moving device on said first shaft,
      2. fluid pressure actuated means in fluid communication with said clutch to selectively engage said friction elements within said clutch,
      3. liquid cooling conduits leading to and through said friction clutch means to circulate a coolant to dissipate heat thereof,
   c. a second power drive unit,
      1. gearing means connected to said second power drive unit,
      2. a dynamic braking mechanism mounted on said first shaft and connected with said gearing means to control the torque on said first shaft,
      3. sensing means to selectively sense the change in load on the load moving device to control the air input to the air actuated device and said dynamic brake to control the degree of engagement of said friction elements.

2. A dynamic friction-coupled device to constantly rotate a friction element with respect to a driven friction element, including a fluid pressure actuated device comprising:
   a. a first power drive unit,
      1. a load moving device,
      2. clutch means connected in power driven relation between said power unit and said load moving device,
      3. fluid pressure means connected in fluid communication with said clutch to selectively actuate said clutch,
      4. liquid cooling conduits leading to and through said clutch to circulate a coolant to dissipate heat thereof,
   b. a second power-driven dynamic braking mechanism connected in power driven relation with the shaft of said load moving device,
      1. a conduit leading to said dynamic brake to selectively engage friction elements therein to retard the rotation of said shaft,
      2. fluid pressure control means to selectively sense and regulate the pressure to engage said friction elements in said dynamic brake, to control said load moving device to maintain said load against movement in either direction or to permit movement in either direction, and
      3. liquid coolant pipes connected in fluid communication with said dynamic brake to circulate a coolant therethrough to maintain said friction elements within a predetermined temperature range.

3. A dynamic, friction-coupled device between a drive element and a driven element, including;
   a. a first power drive unit,
   b. a fluid pressure actuated device having at least two relatively movable elements, one said element being a friction element in position to engage at least one other of said relatively movable elements,
   c. a force resistive power drive unit,
   d. a fluid pressure actuated friction couple connected intermediate said first power drive unit and said force resistive power drive unit in power transmitting relation,
   e. a second power drive unit,
   f. a further power drive unit connected in driving relation with said second power drive unit by said fluid pressure actuated friction couple to move a load, g. fluid actuated sensing control means cooperatively associated with said force resistive power driven unit and with said fluid pressure actuated friction couple to sense the load and to control the movement or non-movement thereof.

4. A dynamic friction-coupled device between a drive and driven element, including a fluid pressure-actuated device comprising:
   a. a power-drive unit,
   b. a force-resistive power driven unit,
   c. a fluid pressure actuated friction couple connected intermediate the power drive unit and said force-resistive power driven unit in power transmitting relation,
   d. a cable tension sensing device cooperatively associated with said force-resistive driven unit and said fluid pressure actuated friction couple, to maintain a controlled application of power to the force-resistive power driven unit whereby the fluid pressure actuated friction couple performs a dynamic braking action when driven at a speed different than the output speed thereof;
   e. said force-resistive power driven unit is a winch drum,
   f. a cable connected to said winch drum in winding relation,
   g. a cable tension sensing device having at least three sheaves on said cable, with one sheave in opposed relation mediate said two other sheaves,
      1. said cable tension sensing device anchored against longitudinal movement with respect to said cable,
   h. a control means leading from said cable tension sensing device to said fluid pressure actuated friction couple to vary the engagement of said friction elements therein.

5. A dynamic friction coupled device as defined in claim 4 wherein a second power drive unit is connected in driving relation with said drum to rotate said drum in one direction continuously at a slower rate of speed than said power drive unit.

6. A dynamic friction couple device between a drive and driven element, including a fluid pressure actuated device comprising:
   a. a power drive unit,
   b. a force resistive power driven unit,
   c. a fluid pressure actuated friction couple connected intermediate said power drive unit and said force resistive power driven unit in power transmitting relation, said friction couple including a first member connected to said power drive unit, a second member connected to said power driven unit, friction means carried by one of said members and frictionally engaging the other of said members, and fluid pressure actuated means for varying the force of said friction means against said other member, said power drive unit driving said first member at a speed different from the speed at which said second member is moved by said power driven unit whereby sliding friction exists between said friction means and said other member, and
   d. sensing means for controlling said fluid pressure actuated means to vary said force and maintain a constant application of power back and forth between said power drive unit and said force resistive power driven unit, whereby said driction means and said other member are maintained in a condition of sliding friction therebetween so that said friction couple performs a dynamic braking action when said power driven unit tends to drive said power drive unit.

7. A dynamic friction couple between a drive and driven element, including a fluid pressure actuated device, as defined in claim 6; wherein
   a. said force resistive power driven unit is a winch drum, and
   b. a cable connects to said winch drum in operative relation.

8. A dynamic friction couple device between a drive and driven element, including a fluid pressure actuated device, as defined in claim 7; wherein
   a. said sensing means is cooperatively associated with a cable to maintain said cable at substantially a controlled tension.

9. A slip clutch for operating a controlled tension winch, which slip clutch comprises;
   a. a shaft,
   b. a winch drum mounted on said shaft for rotation about the axis thereof,
      1. a cable reeled onto said winch drum and leading therefrom,
      2. a load connected to said cable,
   c. a fluid actuated plate clutch connected to said winch drum in friction couple relation,
   d. a cable tension sensing means mounted on said cable.
      1. a transmission means connected to said cable tension sensing means,
      2. a tension sensing control unit connected to said transmission means,
      3. a fluid pressure conduit means connected to said fluid actuated plate clutch and to said tension sensing control unit,
      4. said tension sensing control unit being adapted to vary the fluid pressure in said conduit leading to said fluid actuated plate clutch in accordance with the movement of the tension sensing means on said cable so as to maintain a constant tension on said cable,
   e. a power drive unit,
   f. drive means connected to said power drive unit and being connected in friction coupled relation with said fluid actuated plate clutch to control the rotation of said winch drum in accordance with the tension on said cable, which tension is varied by varying the rate of slippage of said clutch,
   g. a source of cooling fluid connected to said clutch mechanism,
      1. a conduit connected in fluid communication to said source of cooling fluid and leading to and through said clutch, and
      2. fluid pressure means directing cooling fluid from said source of cooling fluid to and through said clutch to constantly cool the interengaging parts of the clutch to permit the clutch to slip over an indefinite period of time, without moving a load attached thereto to any appreciable extent.

10. A slip clutch for operating a controlled tension winch, as defined in claim 9; wherein
    a. two cable tension sensing units are provided,
       1. a winch drum for each cable tension sensing unit,
    b. spaced apart elevated stations,
       1. sheaves on each said elevated station, 2. a cable leading from each said winch drum and over said sheaves to support and move a load by said cables,
c. said cable tension sensing means mounted on each said cable to automatically transmit a signal to each of two tension sensing control units to control the fluid pressure to said fluid actuated plate clutches, and
   1. said fluid actuated plate clutches connected in friction coupled relation between said power drive units and said winch drums to vary the engagement of the fluid actuated plate clutches to automatically maintain a predetermined tension on the respective cables.

11. A mechanism for transferring a load, an integral part of which mechanism is a slip clutch for operating a constant tension winch, which mechanism comprises;
a. a shaft,
b. a winch drum mounted on said shaft for rotation about the axis thereof,
   1. a cable reeled onto said winch drum,
   2. a load connected to said cable,
c. a power drive unit,
d. a fluid actuated clutch connected in friction couple relation with said winch drum,
   1. fluid conduit means connected to said fluid actuated plate clutch,
   2. control valves within said conduits leading to said fluid actuated plate clutch to selectively vary the engagement between the drive and driven elements in said fluid actuated plate clutch.
   3. a cable tension sensing means mounted on said cable in operative relation and reeled onto said winch drum,
   4. said load sensing control means being cooperatively connected with said control valves to vary the fluid pressure to said fluid actuated plate clutch,
d. drive means connected to said power drive unit and to a portion of said fluid actuated plate clutch,
   1. said fluid actuated clutch being in friction coupled relation with said winch drum to selectively drive said winch drum in accordance with a variable rate of slippage of said fluid actuated plate clutch as controlled by said cable tension sensing means, and
f. fluid cooling media adapted to be directed through the conduit means leading to and through said clutch to cool the interengaging parts of the clutch to permit the clutch to slip continuously over an indefinite period of time, without moving a load attached thereto to any appreciable extent.

* * * * *